(12) United States Patent
Alasti et al.

(10) Patent No.: US 10,931,365 B2
(45) Date of Patent: *Feb. 23, 2021

(54) TIMING ADVANCE FOR SATELLITE-BASED COMMUNICATIONS USING A SATELLITE WITH ENHANCED PROCESSING CAPABILITIES

(71) Applicant: DISH Network L.L.C., Englewood, CO (US)

(72) Inventors: Mehdi Alasti, Reston, VA (US); Siddhartha Chenumolu, Broadlands, VA (US); Amirali Emami, Vienna, VA (US); Mariam Sorond, Englewood, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/151,936

(22) Filed: Oct. 4, 2018

(65) Prior Publication Data

US 2019/0349077 A1    Nov. 14, 2019

Related U.S. Application Data

(63) Continuation-in-part of application No. 16/047,355, filed on Jul. 27, 2018.

(Continued)

(51) Int. Cl.
*H04B 7/185* (2006.01)
*H04W 56/00* (2009.01)
(Continued)

(52) U.S. Cl.
CPC ...... *H04B 7/18547* (2013.01); *H04W 56/006* (2013.01); *H04W 56/0045* (2013.01); *H04W 74/0833* (2013.01); *H04W 72/0406* (2013.01)

(58) Field of Classification Search
CPC ............. H04W 56/0045; H04W 4/029; H04W 74/0833; H04B 7/18512
See application file for complete search history.

(56) References Cited

U.S. PATENT DOCUMENTS

| | | | |
|---|---|---|---|
| 6,107,959 A * | 8/2000 | Levanon | G01S 5/0036 342/357.64 |
| 9,882,632 B1 * | 1/2018 | Fang | H04B 7/18584 |

(Continued)

FOREIGN PATENT DOCUMENTS

| | | | |
|---|---|---|---|
| EP | 3 030 018 A1 | 6/2016 | |
| WO | WO-2018031290 A1 * | 2/2018 | ............ H04W 48/00 |

OTHER PUBLICATIONS

U.S. Appl. No. 16/047,355, filed Jul. 27, 2018 Non-Final Rejection dated May 31, 2019, all pages.

(Continued)

*Primary Examiner* — Muthuswamy G Manoharan
(74) *Attorney, Agent, or Firm* — Kilpatrick Townsend & Stockton LLP

(57) ABSTRACT

Various arrangements are presented for using an estimated timing advance for user equipment communications. A location of an instance of user equipment may be determined. An estimated distance between the user equipment and a communication satellite may be determined using the determined location of the user equipment and an estimated satellite location. An estimated timing offset using the calculated estimated distance may be determined. An uplink data frame may be transmitted by the user equipment to the satellite such that a timing of transmission of the uplink data frame is based on the calculated estimated timing offset.

14 Claims, 6 Drawing Sheets

Related U.S. Application Data

(60) Provisional application No. 62/670,349, filed on May 11, 2018.

(51) Int. Cl.
  *H04W 74/08* (2009.01)
  *H04W 74/04* (2009.01)
  *H04W 72/04* (2009.01)

(56) References Cited

U.S. PATENT DOCUMENTS

| | | |
|---|---|---|
| 10,624,052 B2 | 4/2020 | Alasti et al. |
| 2004/0024791 A1* | 2/2004 | Martin ............... H04B 7/18563 |
| 2005/0095982 A1 | 5/2005 | Blanchard et al. |
| 2006/0281476 A1* | 12/2006 | Lane ................... H04B 7/2125 |
| | | 455/502 |
| 2010/0087141 A1 | 4/2010 | Agarwal |
| 2011/0256865 A1 | 10/2011 | Sayeed et al. |
| 2018/0006710 A1* | 1/2018 | Buer .................. H04B 7/18519 |
| 2018/0241464 A1* | 8/2018 | Michaels ............. H04B 7/0617 |
| 2018/0352527 A1* | 12/2018 | Wang ................... H04L 5/0053 |
| 2019/0116568 A1* | 4/2019 | Fertonani .............. H04W 56/00 |

OTHER PUBLICATIONS

International Search Report and Written Opinion for PCT/US2019/026993 dated Jun. 26, 2019, all pages.
International Search Report and Written Opinion for PCT/US2019/026937 dated Jun. 25, 2019, all pages.

* cited by examiner

TIMING ADVANCE FOR SATELLITE-BASED COMMUNICATIONS USING A SATELLITE WITH ENHANCED PROCESSING CAPABILITIES

CROSS-REFERENCES TO RELATED APPLICATIONS

This application is a continuation-in-part of U.S. patent application Ser. No. 16/047,355, entitled "Timing Advance for Satellite-based Communications" filed on Jul. 27, 2018, which claims priority to U.S. Provisional App. No. 62/670,349, entitled "Timing Advance for Satellite-based Communications", filed on May 11, 2018, the entire disclosures of both of these applications are incorporated by reference for all purposes.

BACKGROUND

Communication between user equipment (UE) and a base station (e.g., an eNodeB, gNodeB) results in an amount of time elapsing between when a signal is transmitted (e.g., by the UE) and received (e.g., by the base station). This amount of delay is due to the propagation speed of electromagnetic radiation. Typically, this mount of delay is relatively small because UE tends to be within a relatively short distance of the base station. For instance, a range of less than one kilometer to ten kilometers between the UE and base station may be common. However, circumstances exist where this distance may be significantly greater.

SUMMARY

Various embodiments are described related to using an estimated timing advance for satellite-based communications. In some embodiments, a method for using an estimated timing advance for satellite-based communications is described. The method may include determining, by user equipment, a location of the user equipment using a global navigation satellite system. The method may include calculating, by the user equipment, an estimated distance between the user equipment and a communication satellite using the determined location of the user equipment and an estimated satellite location. The estimated satellite location may indicate an estimated orbital location of the communication satellite. The method may include calculating, by the user equipment, an estimated timing offset using the calculated estimated distance. The method may include transmitting, by the user equipment, to the communication satellite, an uplink data frame such that a timing of transmission of the uplink data frame may be based on the calculated estimated timing offset.

Embodiments of such a method may include one or more of the following features: The uplink data frame transmitted to the communication satellite may include a physical random access channel (PRACH) preamble. The method may further include determining, by the communication satellite, an amount of timing error due to the estimated distance being estimated. The method may further include determining, by the communication satellite, a timing advance (TA) value based on the amount of timing error. The method may include transmitting, by the communication satellite, a TA command that includes the TA value to the user equipment via the communication satellite. The communication satellite may be functioning as a distributed unit. A gNodeB may be functioning as a centralized unit in communication with the distributed unit via a satellite gateway. The method may further include receiving, by the user equipment, the TA command that includes the TA value at the user equipment from the communication satellite. The method may include using, by the user equipment, the estimated timing advance and the received TA value to create a corrected TA value. The method may include transmitting, by the user equipment, to the communication satellite, data such that a timing of transmission of the data may be based on the corrected TA value. The TA value may be twelve bits in length. The TA value may have a defined maximum value of 3846. The TA value may allow for a timing correction of less than 2.5 ms. A maximum amount of error of the determined estimated distance may be 100 km. The method may further include accessing locally-stored orbital information of the communication satellite. The communication satellite may be in low earth orbit (LEO) or middle earth orbit (MEO). The method may include calculating the estimated satellite location based on the locally-stored orbital information.

In some embodiments, a device for using an estimated timing advance for satellite-based communications is described. The device may include a satellite antenna for communicating directly with a communication satellite that relays communications to a satellite gateway system. The device may include a global navigation satellite system (GNSS) component. The device may include one or more processors in communication with the satellite antenna and the GNSS component. The one or more processors may be configured to determine a location of the device using the GNSS component. The one or more processors may be configured to calculate an estimated distance between the device and the communication satellite using the determined location of the device and an estimated satellite location. The estimated satellite location may indicate an estimated orbital location of the communication satellite. The one or more processors may calculate an estimated timing offset using the calculated estimated distance. The one or more processors may transmit, to the communication satellite, via the satellite antenna, an uplink data frame such that a timing of transmission of the uplink data frame may be based on the calculated estimated timing offset.

Embodiments of such a device may include one or more of the following features: The uplink data frame transmitted to the communication satellite may include a physical random access channel (PRACH) preamble. The one or more processors may be further configured to receive a timing advance (TA) command that includes a TA value from the communication satellite. The one or more processors may be further configured to using the estimated timing advance and the received TA value to create a corrected TA value. The one or more processors may be further configured to cause data to be transmitted to the communication satellite such that a timing of transmission of the data may be based on the corrected TA value. The TA value may be twelve bits in length. The TA value may allow for a timing correction of less than 2.5 ms. The one or more processors may be further configured to access stored orbital information indicative of an orbit of the communication satellite. The communication satellite may be in low earth orbit (LEO) or middle earth orbit (MEO). The one or more processors may calculate the estimated satellite location based on the locally-stored orbital information.

In some embodiments, a system for using an estimated timing advance for satellite-based communications is described. The system may include a communication satellite. The system may include a communication network gateway system that communicates with the communication satellite. The system may include user equipment. The user equipment may include a satellite antenna for communicating with the communication satellite that may relay communications to a satellite gateway system. The user equipment may include a global navigation satellite system (GNSS) component. The user equipment may include one or more processors in communication with the satellite antenna and the GNSS component. The one or more processors may be configured to determine a location of the user equipment using the GNSS component. The one or more processors may calculate an estimated distance between the user equipment and the communication satellite using the determined location of the user equipment and an estimated satellite location. The estimated satellite location may indicate an estimated orbital location of the communication satellite. The one or more processors may calculate an estimated timing offset using the calculated estimated distance. The one or more processors may transmit, to the communication satellite, via the satellite antenna, an uplink data frame such that a timing of transmission of the uplink data frame may be based on the calculated estimated timing offset.

Embodiments of such a system may include one or more of the following features: The communication satellite may function as a distributed unit and the communication network gateway system may function as a centralized unit. The communication satellite may be further configured to determine an amount of timing error due to the estimated distance being estimated. The system may determine a timing advance (TA) value based on the amount of timing error. The system may transmit a TA command that includes the TA value to the user equipment via the communication satellite. The one or more processors of the user equipment may be further configured to receive, via the satellite antenna, the TA command that includes the TA value at the user equipment from the communication satellite. The one or more processors may use the estimated timing advance and the received TA value to create a corrected TA value. The one or more processors may cause the satellite antenna to transmit data to the communication satellite such that a timing of transmission of the data may be based on the corrected TA value.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
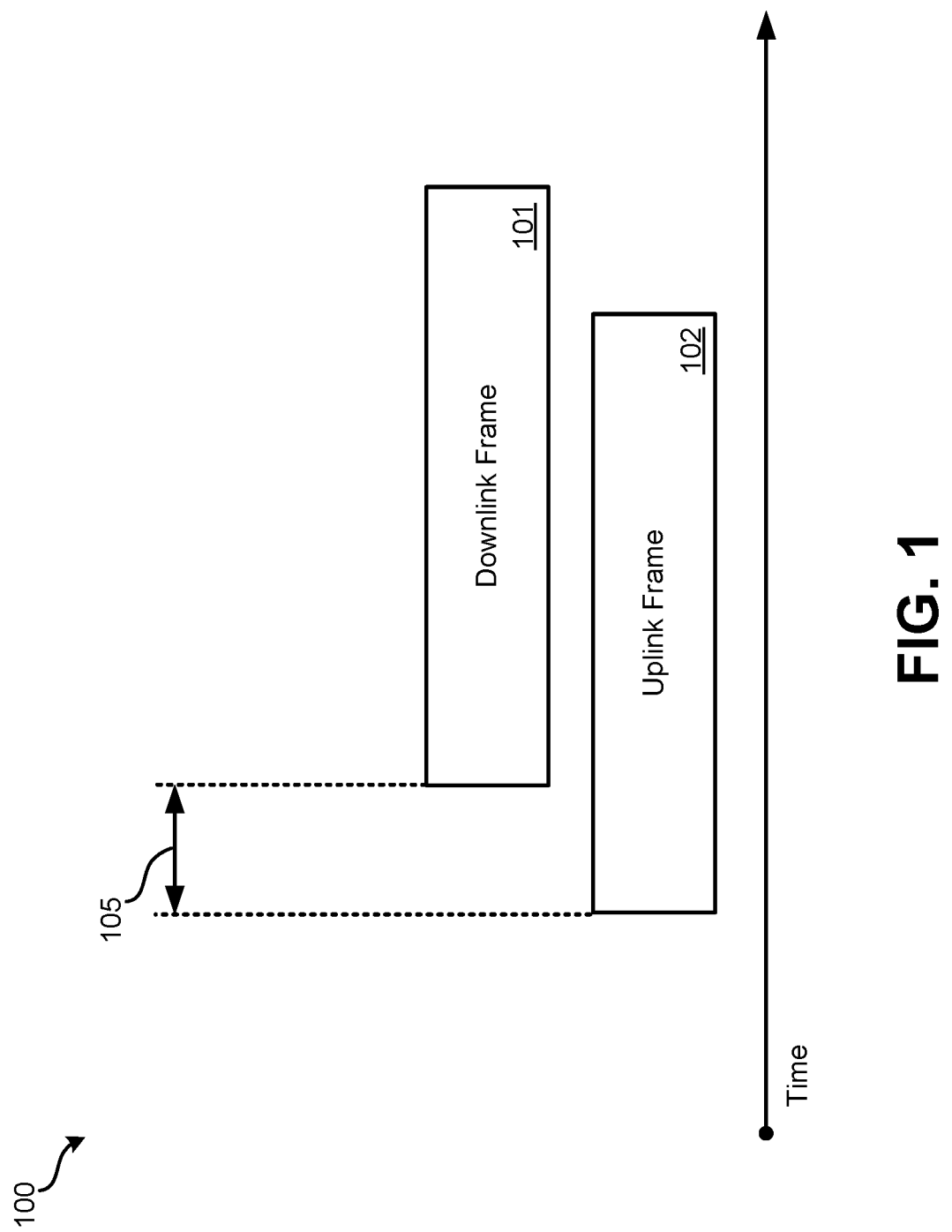
FIG. 1 illustrates a diagram representing the timing relationship of a received downlink frame and a transmitted uplink frame.

In certain circumstances, the distance between user equipment (UE) and a base station (e.g., a gNodeB, an eNodeB) may be significantly greater than the previous example of less than one to a hundred kilometers. If UE communicates with, for example, a gNodeB via a communication satellite, the distance between the UE and the base station can be significantly greater. If the communication satellite is located in geosynchronous orbit, the communication satellite may be in orbit of the earth at an altitude of approximately 35,786 kilometers. Due to signal propagation between the UE and the communication satellite, the communication satellite and a satellite gateway, and the satellite gateway and a communication network gateway, such as a base station (e.g., eNodeB, gNodeB), a signal from UE being transmitted to the communication network gateway may travel over 71,572 kilometers. This distance can result in a signal taking at least 540 milliseconds to travel between the UE and the communication network gateway. In such embodiments, the communication satellite may be functioning as a relay. That is, the communication satellite may receive data from UE or a base station and relay the same data to the base station or the UE without editing or processing being performed on the data. This arrangement is sometimes referred to as a "bent pipe" model.

In other embodiments, however, the satellite may serve to function as a distributed unit (DU). A DU may perform at least some processing on data received from UE and/or a base station. Other functions may remain being performed by a communication network gateway (e.g., a base station, a gNodeB, an eNodeB). In such an arrangement, the communication network gateway may be referred to as a centralized unit (CU).

By the communication satellite functioning as a DU, various technical advantages may be realized. For instance, the DU may be able to allow for mesh connectivity between UE. That is, a first UE may communicate with a second UE via the communication satellite without the communications needing to be routed through a ground-based satellite gateway, thus helping to keep communication latency low. Further, by the communication satellite functioning as a DU, at least some additional bandwidth may be freed between the DU and CU since some processing is performed by the DU and not all data needs to be routed to the communication network gateway for processing.

When the communication satellite is used as a DU (as opposed to the bent pipe model), the distance between the communication satellite and the communication network gateway may not affect how the timing of communications between the DU and UE is structured. However, a distance of approximately 35,786 between the UE and the DU is still significant, and can result in a delay of at least 270 milliseconds in travel time between the UE and the communication satellite functioning as the DU.

A timing advance (TA) is a negative timing offset that is used by UE to determine when uplink data (e.g., an uplink subframe) should be transmitted by the UE in relation to downlink data (e.g., the downlink subframe) received by the UE. By using the TA and offsetting transmission of the uplink data before the downlink data is received, the TA can allow for the uplink data (e.g., uplink subframe) to be synchronized with the downlink data at the communication network gateway, such as the eNodeB or gNodeB. Equation 1 defines how the TA is used to determine when an uplink frame should be transmitted in relation to the downlink frame:

$$T_{TA}=N_{TA}T_S \qquad \text{Eq. 1}$$

In Equation 1, $T_S$ represents the sampling time, which can depend on the subcarrier spacing (SCS). $T_{TA}$ represents the timing advance. $N_{TA}$ is a command that is transmitted by the communication gateway to the UE in the form of a timing advance command that is used by the UE to determine $T_{TA}$. FIG. 1 illustrates a diagram 100 representing the timing relationship at the UE of a received downlink frame 101 and a transmitted uplink frame 102. The uplink frame is transmitted $N_{TA}T_S$, represented by time period 105, ahead of the downlink frame being received such that at the communication network gateway, the downlink frame and uplink frame are temporally synchronized.

The size of the timing advance command field ($N_{TA}$) may have a defined length. For instance, under the proposed Fifth Generation Wireless Systems (5G), the timing advance command field may be limited to twelve bits. While twelve bits allows for a decimal value of 4095, the maximum value for the timing advance command field may be limited to 3846. In other embodiments, such as in 4G LTE, the TA field is eleven bits. Further, when a large timing advance is used, a guard-time (GT) used as part of the random access channel (RACH) preamble may need to be long in duration to account for the communication delay.

In an embodiment in which a satellite is functioning as a DU, the greater the distance between the UE and the communication satellite, the greater the value of the timing advance command may need to be such that the uplink subframe and the downlink subframe are synchronized. Without modification, in a scenario where frames are relayed by a geosynchronous communication satellite functioning as a DU, a satellite in low earth orbit (LEO) functioning as a DU, or medium earth orbit (MEO) functioning as a DU, a twelve bit value for the timing advance command field may be insufficient such that a great enough timing advance is used by the UE such that the uplink frame and downlink frame are synchronized at the DU.

Embodiments detailed herein allow for a UE to apply a sufficient timing offset such that downlink and uplink frames are approximately synchronized at the communication satellite functioning as the DU and allowing for the DU to perform a further, smaller adjustment using a timing advance value. Further, embodiments detailed herein allow for the GT to be kept low despite the large distance between the UE and the communication satellite functioning as the DU. In embodiments detailed herein, an estimate of the distance between the UE and the communication satellite can be determined since the satellite remains roughly in the same location (or travels according to a predictable orbit for LEO and MEO satellites). This determined estimate may be used for determining an initial estimated timing offset, which then may be adjusted by the DU based on an actual observed data transmission time.

By using such an estimated timing offset, the performance of the communication system may be significantly improved. For instance, additional data (e.g., a timing advance command field with an expanded amount of bits) does not need to be transmitted since the TA value may be kept at twelve bits or smaller. Additionally or alternatively, a long guard time does not need to be introduced to account for the time delay between the UE and the DU, allowing the network resources to be more efficiently used.

Figure 2:
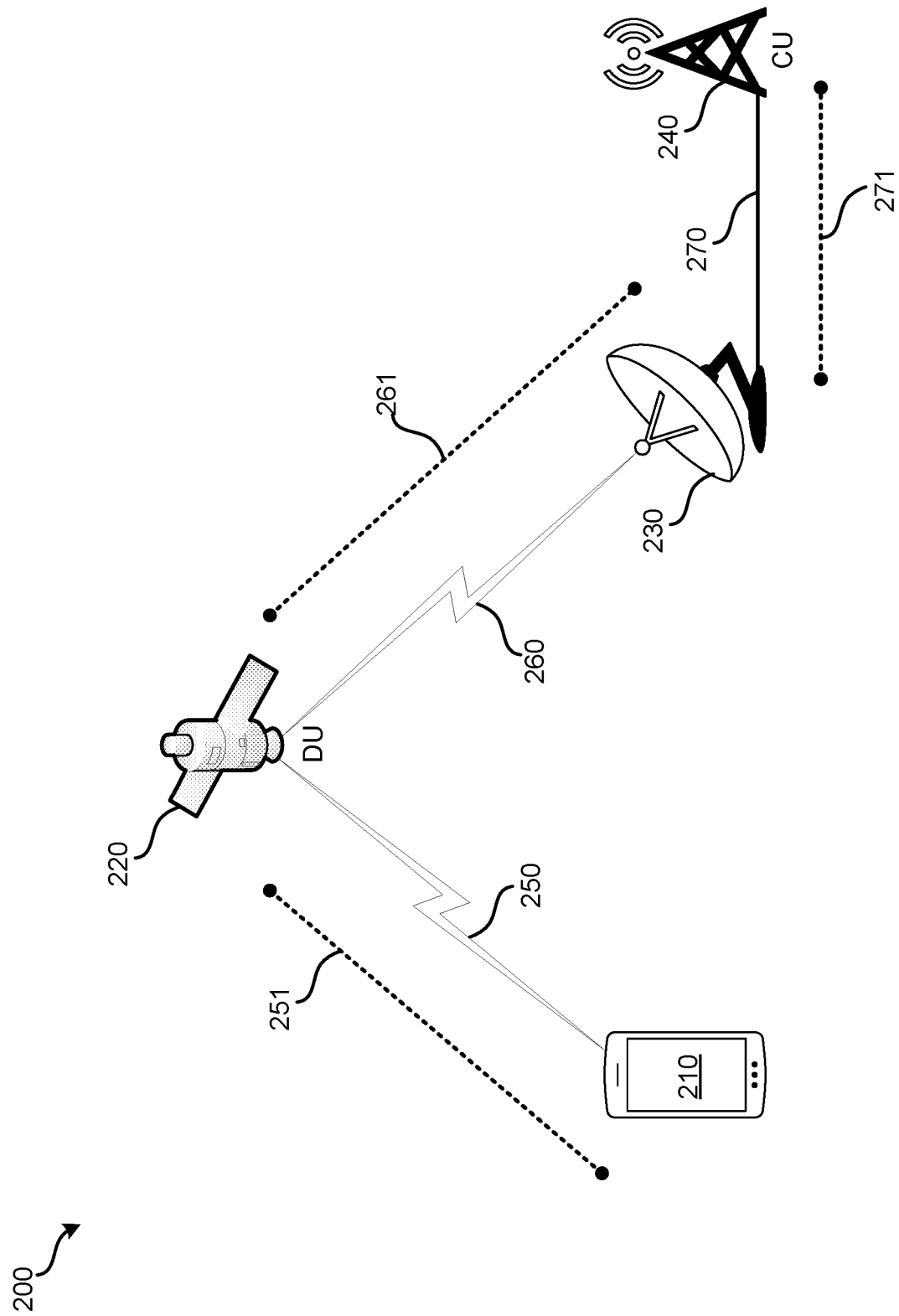
FIG. 2 illustrates an embodiment of a satellite-based communication network.

FIG. 2 illustrates an embodiment of a satellite-based communication system 200. Satellite-based communication system 200 may comprise: UE 210, communication satellite 220, satellite gateway system 230, and communication network gateway 240. UE 210 may represent various computerized devices that can be used for communication purposes, such as: a satellite phone; a satellite smartphone; a satellite modem; or some other form of communication device enabled to communicate directly with a GEO, LEO, or MEO satellite.

Communication satellite 220 may serve multiple functions. First, communication satellite may relay data between UE 210 and satellite gateway system 230. Second, communication satellite may perform at least some processing on data received from UE 210 and/or satellite gateway system 230. This processing may involve changing contents of the data, changing the order in which data is transmitted, and/or changing the timing of when data is transmitted.

Communication satellite 220 may receive a signal from satellite gateway system 230 and transmit to UE 210 on a different frequency, referred to as a downlink transmission, possibly using different timing than was used to transmit the data to communication satellite 220 by satellite gateway system 230. Communication satellite 220 may receive a signal from UE 210 and transmit to satellite gateway system 230 on a different frequency, referred to as a downlink transmission, possibly using different timing than was used to transmit the data to communication satellite 220 by UE 210. Satellite gateway system 230 may serve to transmit and receive messages with communication satellite 220. Satellite gateway system 230 may receive messages for transmission to UE 210 from communication network gateway 240 and transmit such messages via communication satellite 220 to UE 210. Satellite gateway system 230 may receive messages from communication satellite 220 that are from UE 210 and translate and transmit such messages to communication network gateway 240.

In embodiments where at least some processing on received data is being performed by communication satellite 220, the communication satellite 220 is functioning as a distributed unit (DU). A DU can function in combination with a centralized unit (CU) to perform the functions of a communication network gateway. Therefore, the distributed functionality of a DU in combination with a CU allow for the functionality of a communication network gateway to be realized. In some embodiments, such as in a 4G (LTE Rel-15 or later) or 5G network, the DU may performing the functionality related to the physical layer, medium access control (MAC) layer, and/or radio link control (RLC) layer. A CU may perform functions related to the Packet Data Convergence Protocol (PDCP) layer and/or Service Data Adaptation Protocol (SDAP) layer. As detailed herein, determination and transmission of a timing advance value may be performed by the DU and, therefore, may only need to account for a delay in communications between the DU and the UE.

Communication network gateway 240 may serve as a link between satellite gateway system 230 and one or more other networks, such as the Internet, a 4G or 5G wireless communication network, or some other form of communication network. In some embodiments, satellite gateway system 230 and communication network gateway 240 are collocated and/or are combined into a single gateway system (i.e., a gateway system that converts directly between satellite communications and a communication network). In other embodiments, communication network gateway 240 is located a distance from satellite gateway system 230 and either wireless or wired (e.g., fiber-optic based) communication is used between satellite gateway system 230 and communication network gateway 240. In some embodiments, communication network gateway 240 comprises an eNodeB (Evolved Node B or eNB) or gNodeB (Next generation Node B or gNB). Communication network gateway 240 may be part of a 4G, 5G, or some other generation of wireless communication network.

For a transmission from UE 210 to communication network gateway 240, uplink data may be transmitted via wireless communication path 250, wireless communication path 260, and, if communication network gateway 240 is located a distance from satellite gateway system 230, communication path 270. Therefore, uplink data transmitted by UE 210 has three distances to traverse: distance 251, distance 261, and distance 271 (if communication network gateway 240 is located a distance from satellite gateway system 230). However, processing related to transmission or propagation delay may be performed at communication satellite 220 when communication satellite 220 is functioning as a DU. Therefore, only the transmission delay due to distance 251 may need to be factored into the timing of communication signals between communication satellite 220 and UE 210. Distances 261 and 271 may be inconsequential for the determination of signal timing.

Despite distance 251 being large, distance 251 may be estimated with a relatively high degree of accuracy by UE 210 if the UE is provided with certain data. For instances where communication satellite 220 is in geosynchronous orbit, communication satellite 220 remains within an orbit slot or window approximately above a fixed position on the earth's equator. Relative the satellite's position above the earth, the window is relatively small: a geosynchronous satellite may be about 35,786 km above the earth's surface. The window may be approximately 50 kilometers in each direction from a center of the satellite's defined orbital position.

UE 210 may be able to determine its own location on earth, such as using a global navigation satellite system (GNSS). For instance, a global positioning system (GPS) module may be on-board UE 210 that allows the UE to determine its own location with a high degree of accuracy. Since UE 210 can determine its own location and can store data indicating the orbital position of communication satellite 220 (which may not account of drift of communication satellite 220 within the window around its orbital position), distance 251 can be estimated. When communication satellite 220 performs processing related to signal timing, distances 261 and 271 may not be needed by UE 210.

Since UE 210 may be able to determine its location precisely, the possibly unknown variable is movement of communication satellite 220 within its orbital window. This variation, however, is small compared to distance 251 and may be accounted for using a TA value is calculated by the DU.

Figure 3:
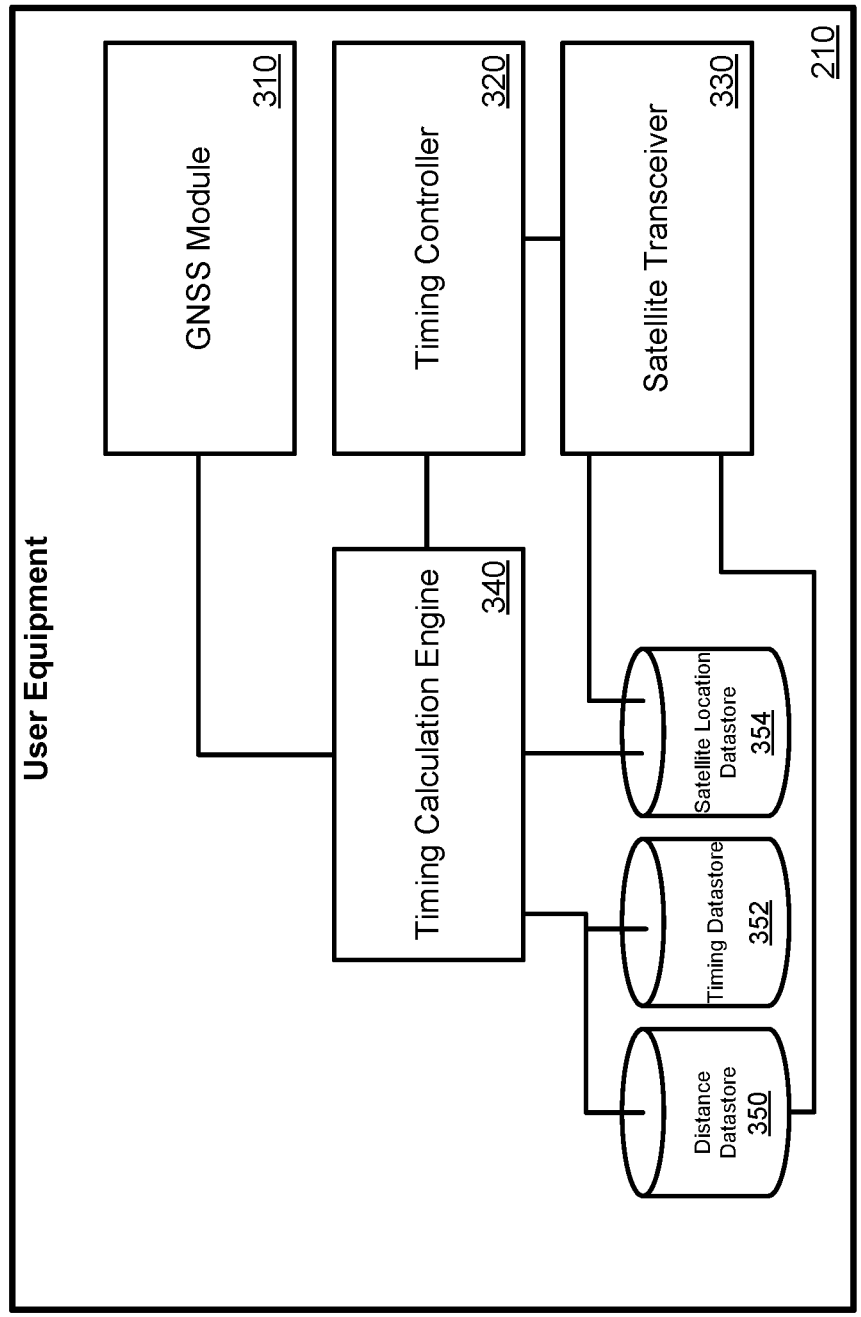
FIG. 3 illustrates a block diagram of an embodiment of user equipment (UE).

FIG. 3 illustrates a block diagram of an embodiment of UE 210. UE 210 may include GNSS module 310, timing controller 320, satellite transceiver 330, timing calculation engine 340, distance datastore 350, timing datastore 352, and satellite location datastore 354. GNSS module 310 may use one or more of various available global navigation satellite systems (e.g., GPS, GLONASS, Galileo, Beidou) to determine a location of UE 210. GNSS module 310 may periodically provide an indication of location of UE 210 to timing calculation engine 340.

Timing controller 320 may control when an uplink data frame is transmitted by satellite transceiver 330. Timing controller 320 may receive an indication of an estimated timing offset that is to be applied to uplink frames from timing calculation engine 340. Timing controller 320 may implemented in software, firmware, or hardware. For instance, timing controller 320 may be implemented using one or more specialized or general-purpose processors, possibly in combination with timing calculation engine 340.

Satellite transceiver 330 may transmit and receive data with communication satellite 220. When uplink data is transmitted by satellite transceiver 330 may be based on timing information provided by timing controller 320.

Timing calculation engine 340 may access stored data from distance datastore 350, timing datastore 352, and/or satellite location datastore 354 in order to determine when uplink data is to be transmitted in relation to downlink data by satellite transceiver 330. Timing calculation engine may perform blocks as detailed in relation to method 500 of FIG. 5 in order to determine an amount of estimated timing advance. Timing calculation engine 340 may implemented in software, firmware, or hardware. Timing calculation engine 340 may be implemented using one or more specialized or general-purpose processors.

Distance datastore 350 may be used to store indications of distance 251 Alternatively, since distance 251 is calculated by timing calculation engine 340 based on location data from GNSS module 310, distance 251 may be calculated when needed and not stored to distance datastore 350.

In some embodiments, in addition or in alternate to storing distances in distance datastore 350, timing values may be stored in timing datastore 352. That is, rather than (or in addition to) storing an indication of distance 251, one or more values that indicate an estimated amount timing offset that corresponds to distance 251 may be stored.

Satellite location datastore 354 may store the estimated orbital location of communication satellite 220 if it is a geosynchronous satellite. The precise location of communication satellite 220 may vary about 50 kilometers in any direction from the orbital location, thus the stored location of communication satellite 220 may be only an estimate. If communication satellite 220 is in LEO or MEO orbit, rather than satellite location datastore 354 storing a defined location, satellite location datastore 354 may store data representative of an orbit of communication satellite 220 such that timing calculation engine 340 can calculate a current location of communication satellite 220.

UE 210 may include various other computerized components that are omitted from FIG. 3 for simplicity. One or more processors; one or more processor-readable storage arrangements; one or more data buses; one or more wired and/or wireless interfaces; and/or one or more user interfaces may be present in various embodiments of UE 210.

Figure 4:
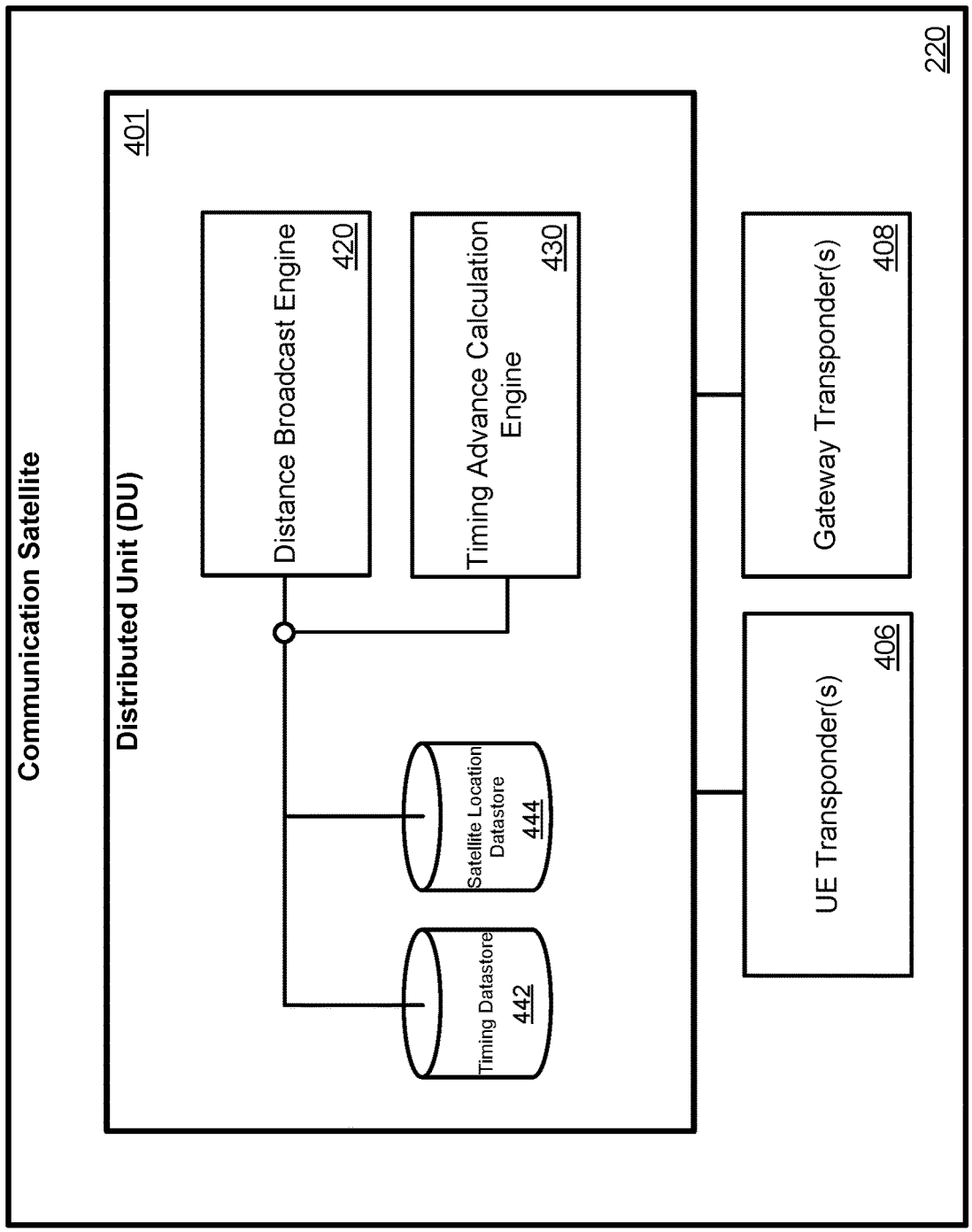
FIG. 4 illustrates a block diagram of an embodiment of a communication satellite functioning as a distributed unit (DU).

FIG. 4 illustrates a block diagram of an embodiment of communication satellite 220. While an estimated timing offset may be determined and used by the UE initially, DU 401 residing at communication satellite 220, such as during a RACH process, may determine a timing advance value to correct the detected timing difference between a downlink frame being sent to the UE and an uplink frame received from the UE due to distance 251. Therefore, the TA value determined by DU 401 may be used to adjust the estimated timing offset being used by UE 210.

DU 401 of communication satellite 220 may communicate with communication network gateway 240 and/or satellite gateway system 230, either of which may function as a CU that works in conjunction with DU 401 to function as a communication network gateway.

Communication satellite 220 may include hardware components that enable communication with multiple instances of UE, including UE 210 and one or more instances of satellite gateways, such as satellite gateway system 230. Communication satellite 220 may include one or more UE transponders 406 and one or more gateway transponders 408. One or more UE transponders 406 may be used for bidirectional communication between communication satellite 220 and instances of UE, such as UE 210. One or more gateway transponders 408 may be used for bidirectional communicate using one or more frequencies between one or more satellite gateways, such as satellite gateway system 230.

Located on-board communication satellite 220 may be DU 401. DU 401 may be executed using one or more on-board processors, one or more non-transitory computer-readable mediums, and/or other computerized components that are incorporated as part of communication satellite 220. In some embodiments, specialized hardware, such as one or more ASICS or firmware may be used to perform the functionality of DU 401. In some embodiments, DU 401 may be implemented as software instructions that are executed using one or more processors. DU 401 may include distance broadcast engine 420, timing advance calculation engine 430, timing datastore 442, and satellite location datastore 444.

Distance broadcast engine 420 may occasionally or periodically be used to transmit location, distance, and/or timing data to multiple UEs. For instance, distance broadcast engine 420 may broadcast the location of communication satellite 220 (for a GEO satellite), or information (e.g., orbit information) to calculate a location of communication satellite 220 (for a MEO or LEO satellite).

Timing advance calculation engine 430 may calculate a timing advance (TA) value based on an uplink data frame received from UE 210. This uplink data frame already was transmitted in advance based on the estimated timing offset calculated by the UE. However, the estimated timing offset does not take into account the exact location of communication satellite 220. Therefore, it is expected that at least some amount of timing advance adjustment may be needed. Since the vast majority of the needed TA is captured in the estimated timing offset determined by the UE, the TA value calculated by TA calculation engine 430 may be comparatively small (and may be captured within twelve bits). The value calculated by TA calculation engine 430 can refer to $N_{TA}$ of Equation 1. The UE, when the value is received, can further adjust the timing advance such that $N_{TA}$ is used to further adjust the estimated timing offset. Timing advance calculation engine 430 may implemented in software, firmware, or hardware. For instance, timing advance calculation engine 430 may be implemented using one or more specialized or general-purpose processors.

Satellite location datastore 444 may store indications of an orbit position of a geosynchronous satellite or may store information that defines or is used to calculate an orbit of a LEO or MEO satellite. Such data may be transmitted periodically or occasionally to instances of UE by distance broadcast engine 420.

Timing datastore 442 may be used to store data related to the calculation of TA values for multiple instances of UE. For instance, timing information that is to be used by TA calculation engine 430 to calculate a TA may be stored to timing datastore 442 and then accessed by timing advance calculation engine 430. Calculated TA values may be stored to timing datastore 442 prior to and/or after transmission to UE.

Communication satellite 220 may include various other computerized components that are omitted from FIG. 4 for simplicity. One or more processors; one or more processor-readable storage arrangements; one or more data buses; one or more wired and/or wireless interfaces; and/or one or more user interfaces may be present in various embodiments of communication satellite 220.

Figure 5:
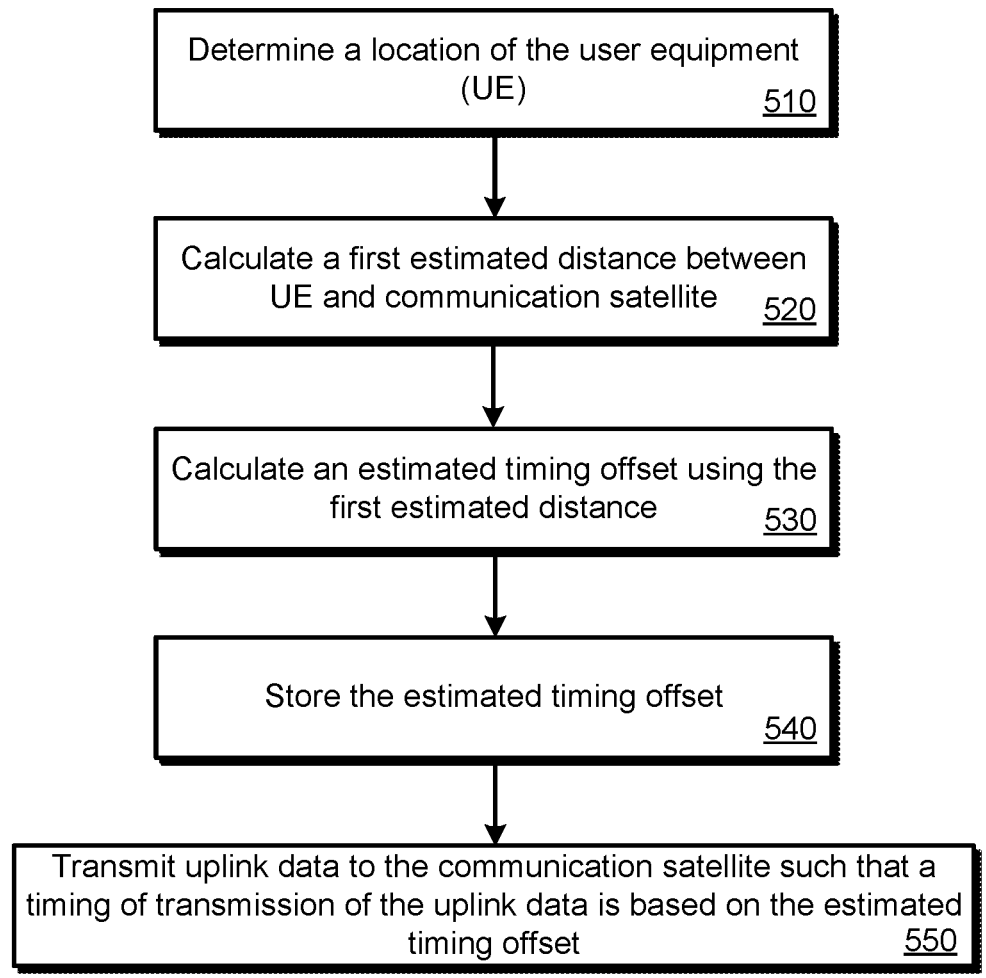
FIG. 5 illustrates an embodiment of a method for determining and using an estimated timing offset for UE communications.

Various methods may be performed using the systems and devices detailed in relation to FIGS. 1-4. FIG. 5 illustrates an embodiment of a method 500 for determining and using an estimated timing offset for user equipment communications. Each step of method 500 may be performed using user equipment, such as UE 210. At block 510, a location of the UE may be determined. The UE may use an on-board GNSS (e.g., GPS) component to determine its location. Other forms of location determination may also be possible. For instance, the UE may be able to determine its location based on user input, sensing one or more particular wireless networks (e.g., a Wi-Fi network), dead reckoning, etc.

At block 520, a first estimated distance between the UE and the communication satellite may be calculated by the UE. Block 520 may involve the UE accessing data that indicates an estimated location of the satellite, such as an indication of a location at the center of the communication satellite's geosynchronous orbital window. In some embodiments, such as if the satellite is in LEO or MEO, the UE may store an indication of an orbit of the communication satellite such that by accessing a current date and time, the UE can determine the approximate location of the communication satellite.

At block 530, a timing offset may be calculated by the UE using the estimated distance from block 520 that is representative of the distance between the communication satellite functioning as the DU and the UE (but not of the distance between the communication satellite and the satellite gateway and/or a CU of the communication network gateway). The timing offset may be calculated based on the distance between the communication satellite and the UE being divided by the speed of electromagnetic radiation (the speed of light). Based on the maximum estimated distance error, a maximum timing error of the offset is expected to be, at most, 0.33 milliseconds.

At block 540, the estimated timing offset may be stored by the UE. At block 550, the estimated timing offset may be used to determine an amount of time ahead of a downlink frame that an uplink frame of data should be transmitted to the communication satellite such that the network communication gateway receives the uplink data approximately in synchronization with the downlink frame it is transmitting to the UE. The estimated timing offset may be used to offset the transmission of uplink data until a TA value is received from the communication network gateway, such as part of the RACH process. The maximum expected amount of error that will be corrected using the TA value may be 0.33 milliseconds, which accounts for the variance in distance. At block 550, the uplink data transmitted may include a physical random access channel preamble (PRACH).

Figure 6:
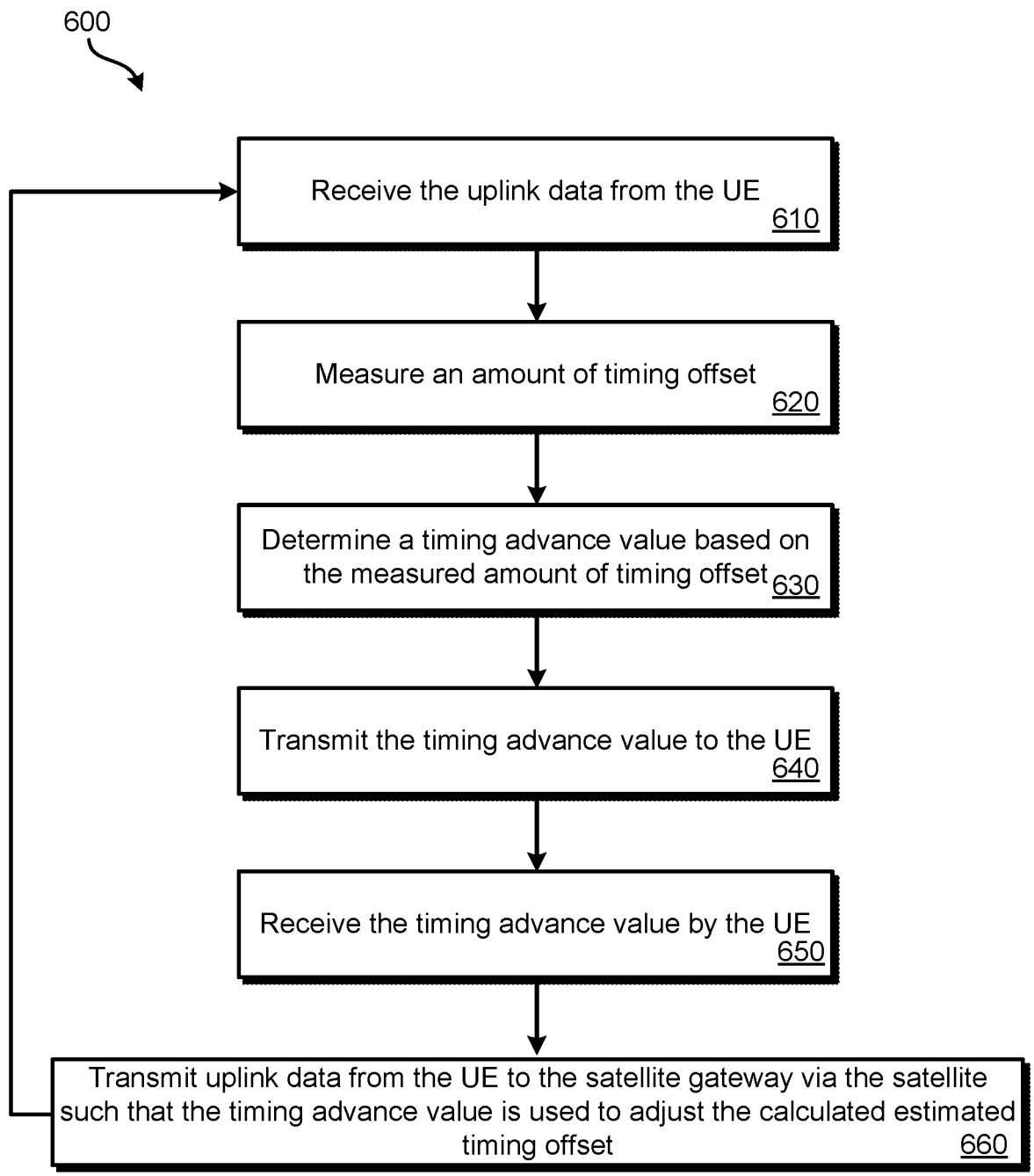
FIG. 6 illustrates an embodiment of a method for creating and using a timing advance (TA) command.

FIG. 6 illustrates an embodiment of a method 600 for creating and using a timing advance (TA) command to correct any timing error present in the estimated timing offset used as part of method 500. Method 600 may be performed following method 500. Method 600 may be performed as part of a RACH process. Each step of method 600 may be performed using a DU that is part of a communication satellite that communicates with the UE. The DU can be in communication with a CU, which may be a communication network gateway, such as a gNodeB or eNodeB. In some embodiments, each block of method 600 may be performed by a communication satellite or, more specifically, a DU residing at or executed by the communication satellite.

At block 610, uplink data, such as in the form of an uplink frame, may be received by the DU of the communication satellite from the UE. At block 620, an amount of timing offset between the uplink frame and the time at which the communication satellite transmits a corresponding downlink frame may be determined. At block 620, it can be expected that the amount of timing offset between the uplink frame and the downlink frame will be significantly smaller in duration than the propagation delay due to the distance between the user equipment and the communication satellite because the user equipment has already applied a timing offset such that the uplink data frame was transmitted early.

At block 630, based on the measured amount of timing offset of block 620, a timing advance value may be determined by the DU of the communication satellite. Based on the offset measured at block 620, the TA value may be determined by the DU of the communication satellite. This TA value may be 12 or fewer bits and may have a maximum value of 3846. The TA value determined at block 630 may be based on Equation 1. Therefore, the timing advance value determined at block 630 can be used by the UE to compute an amount of time to use as the TA. At block 640, the timing advance value may be transmitted to the UE by the communication satellite and the timing advance value may be received by the UE at block 650. The TA value transmitted at block 640 may be part of a random access response (RAR) transmitted by the DU. The timing advance value may be transmitted as part of a timing advance command field that has a defined number of bits, such as twelve.

At block 660, future uplink data transmitted by the UE to the satellite gateway system via the satellite may have its timing modified such that the received TA value is used to adjust the estimated timing offset value calculated as part of method 500. Therefore, the estimated timing offset value is still used in transmitting data by the UE, but is further adjusted based on the received TA value. The UE may continue to receive adjusted TA values over time, which may be repeatedly used to adjust the estimated timing offset value calculated as part of method 500.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for using an estimated timing advance for satellite-based communications, the method comprising:
   determining, by user equipment, a location of the user equipment using a global navigation satellite system;
   calculating, by the user equipment, an estimated distance between the user equipment and a communication satellite using the determined location of the user equipment and an estimated satellite location, wherein:
   the estimated satellite location indicates an estimated orbital location of the communication satellite;
   the communication satellite is functioning as a distributed unit that performs one or more gNodeB functions on data received from the user equipment, wherein the one or more gNodeB functions is selected from the group consisting of:
   medium access control (MAC) layer functionality; and
   radio link control (RLC) layer functionality; and
   a satellite gateway system is functioning as a centralized unit that communicates with the distributed unit and performs one or more additional gNodeB functions on data received from the user equipment via the communication satellite, wherein the one or more additional gNodeB functions is selected from the group consisting of:
   packet data convergence protocol (PDCP) layer functionality; and
   service data adaption protocol (SDAP) layer functionality;
   calculating, by the user equipment, an estimated timing offset using the calculated estimated distance;
   transmitting, by the user equipment, to the communication satellite, an uplink data frame such that a timing of transmission of the uplink data frame is based on the calculated estimated timing offset;
   receiving, by the user equipment, a timing advance (TA) command that comprises a TA value that indicates an amount of timing error due to the estimated distance being estimated;

adjusting, by the user equipment, the calculated estimated timing advance based on the received TA value to create a corrected TA value; and transmitting, by the user equipment, to the communication satellite, data such that a timing of transmission of the data is based on the corrected TA value.

2. The method for using the estimated timing advance for the satellite-based communications of claim 1, wherein the uplink data frame transmitted to the communication satellite comprises a physical random access channel (PRACH) preamble.

3. The method for using the estimated timing advance for the satellite-based communications of claim 2, further comprising:
  determining, by the communication satellite, the amount of timing error due to the estimated distance being estimated;
  determining, by the communication satellite, the TA value based on the amount of timing error; and
  transmitting, by the communication satellite, the TA command that comprises the TA value to the user equipment via the communication satellite.

4. The method for using the estimated timing advance for the satellite-based communications of claim 1, wherein the TA value is twelve bits in length.

5. The method for using the estimated timing advance for the satellite-based communications of claim 4, wherein the TA value has a defined maximum value of 3846.

6. The method for using the estimated timing advance for the satellite-based communications of claim 5, wherein the TA value allows for a timing correction of less than 2.5 ms.

7. The method for using the estimated timing advance for the satellite-based communications of claim 1, wherein a maximum amount of error of the determined estimated distance is 100 km.

8. The method for using the estimated timing advance for the satellite-based communications of claim 1, further comprising:
  accessing locally-stored orbital information of the communication satellite, wherein the communication satellite is in low earth orbit (LEO) or middle earth orbit (MEO); and
  calculating the estimated satellite location based on the locally-stored orbital information.

9. A device for using an estimated timing advance for satellite-based communications, the device comprising:
  a satellite antenna for communicating directly with a communication satellite that relays communications to a satellite gateway system;
  a global navigation satellite system (GNSS) component; and
  one or more processors in communication with the satellite antenna and the GNSS component, the one or more processors configured to:
    determine a location of the device using the GNSS component;
    calculate an estimated distance between the device and the communication satellite using the determined location of the device and an estimated satellite location, wherein:
      the estimated satellite location indicates an estimated orbital location of the communication satellite;
      the communication satellite functions as a distributed unit that performs one or more gNodeB functions on data received from the device wherein the one or more gNodeB functions is selected from the group consisting of:
        medium access control (MAC) layer functionality; and
        radio link control (RLC) layer functionality; and
      a satellite gateway system functions as a centralized unit that communicates with the distributed unit and performs one or more additional gNodeB functions on data received from the device via the communication satellite, wherein the one or more additional gNodeB functions is selected from the group consisting of:
        packet data convergence protocol (PDCP) layer functionality; and
        service data adaption protocol (SDAP) layer functionality;
    calculate an estimated timing offset using the calculated estimated distance;
    transmit, to the communication satellite, via the satellite antenna, an uplink data frame such that a timing of transmission of the uplink data frame is based on the calculated estimated timing offset;
    receive a timing advance (TA) command that comprises a TA value that indicates an amount of timing error due to the estimated distance being estimated;
    adjust the calculated estimated timing advance based on the received TA value to create a corrected TA value; and
    transmit, to the communication satellite, data such that a timing of transmission of the data is based on the corrected TA value.

10. The device for using the estimated timing advance for satellite-based communications of claim 9, wherein the uplink data frame transmitted to the communication satellite comprises a physical random access channel (PRACH) preamble.

11. The device for using the estimated timing advance for satellite-based communications of claim 9, wherein the TA value is twelve bits in length.

12. The device for using the estimated timing advance for satellite-based communications of claim 11, wherein the TA value allows for a timing correction of less than 2.5 ms.

13. The device for using the estimated timing advance for satellite-based communications of claim 9, wherein the one or more processors are further configured to:
  access stored orbital information indicative of an orbit of the communication satellite, wherein the communication satellite is in low earth orbit (LEO) or middle earth orbit (MEO); and
  calculate the estimated satellite location based on the locally-stored orbital information.

14. A system for using an estimated timing advance for satellite-based communications, the system comprising:
  a communication satellite, wherein:
    the communication satellite functions as a distributed unit that performs one or more gNodeB functions on data received from user equipment;
    the communication satellite is configured to:
      determine an amount of timing error due to an estimated distance being estimated by the user equipment;
      determine a timing advance (TA) value based on the amount of timing error; and
      transmit a TA command that comprises the TA value to the user equipment; and
  a satellite gateway system functions as a centralized unit that communicates with the distributed unit and performs one or more additional gNodeB functions on data received from the user equipment;

a communication network gateway system that communicates with the communication satellite; and the user equipment, comprising:
- a satellite antenna for communicating with the communication satellite that relays communications to a satellite gateway system;
- a global navigation satellite system (GNSS) component; and
- one or more processors in communication with the satellite antenna and the GNSS component, the one or more processors configured to:
  - determine a location of the user equipment using the GNSS component;
  - calculate the estimated distance between the user equipment and the communication satellite using the determined location of the user equipment and an estimated satellite location, wherein:
    - the estimated satellite location indicates an estimated orbital location of the communication satellite;
  - calculate an estimated timing offset using the calculated estimated distance;
  - transmit, to the communication satellite, via the satellite antenna, an uplink data frame such that a timing of transmission of the uplink data frame is based on the calculated estimated timing offset;
  - receive, via the satellite antenna, the TA command that comprises the TA value from the communication satellite;
  - adjust the calculated estimated timing advance based on the received TA value to create a corrected TA value; and
  - cause the satellite antenna to transmit data to the communication satellite such that a timing of transmission of the data is based on the corrected TA value.

\* \* \* \* \*